Sept. 28, 1965      C. S. PHELAN      3,208,496
HEAVY LOAD-CARRYING BARREL NUT
Filed June 21, 1963
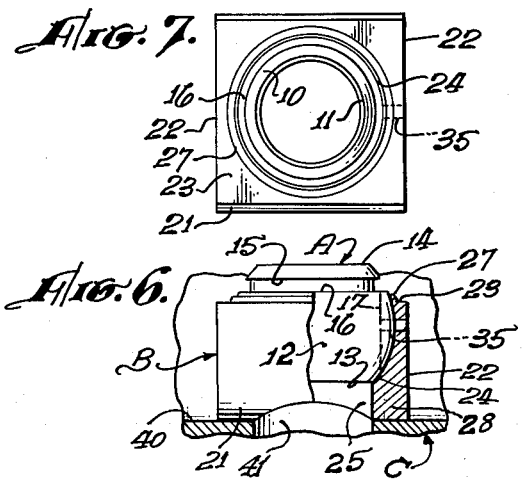
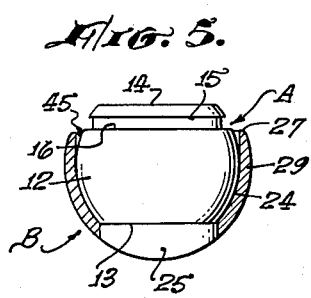
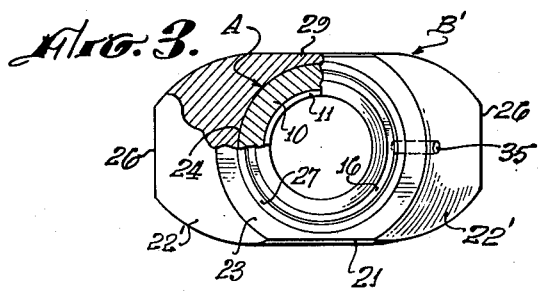
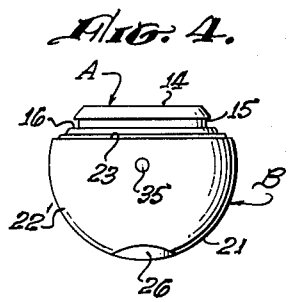
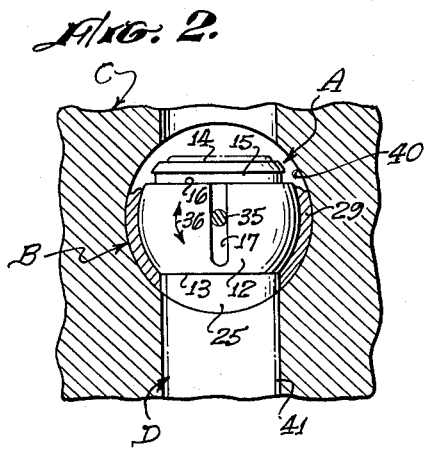
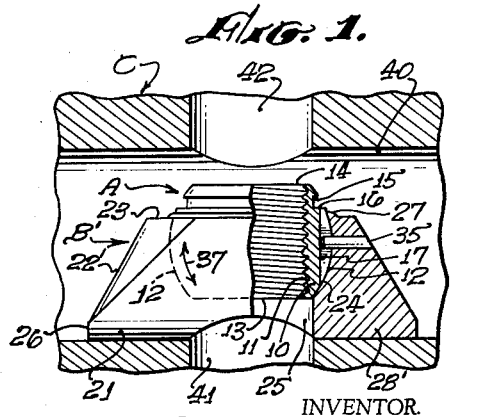
INVENTOR.
CHARLES S. PHELAN,
BY Lynn H. Latta
ATTORNEY.

United States Patent Office 3,208,496
Patented Sept. 28, 1965

3,208,496
HEAVY LOAD-CARRYING BARREL NUT
Charles S. Phelan, Tustin, Calif., assignor to
Frederick W. Rohe, Placentia, Calif.
Filed June 21, 1963, Ser. No. 289,478
4 Claims. (Cl. 151—41.76)

This invention relates to self-aligning nuts of the type known as a barrel nut, and more particularly to the two-part barrel nut assembly, such as disclosed in Rohe Patent No. 3,081,809, issued March 19, 1963, wherein an internally threaded nut element is floatingly mounted in a retainer cradle which in turn is mounted for rocking movement in a cylindrical bearing bore in a body to which a fastening is to be established. Such a nut assembly has the advantage of providing maximum self-aligning properties in the nut assembly during the attachment of the bolt thereto. Such barrel nut assemblies provide extremely satisfactory performance in the lower and intermediate ranges of bearing loads required to be absorbed in the assembly. Demand for the application of such barrel nuts to increasingly higher bearing load requirements and for use in high-temperature environments, however, have developed failure problems. Important demand has arisen for a barrel nut utilizing materials that will withstand high temperature but do not provide adequate strength, in existing barrel nut configurations, to carry the loads imposed thereon. More specifically, in a barrel nut assembly wherein the nut has a flat end bearing face in a flange having a face area equivalent to a major portion of the plan area of the retainer, and where the nut is received in a recess in the retainer extending full-width therethrough and of sufficient depth to position the nut within the extended cylindrical periphery of the retainer, I find that in the higher loading ranges, and also in the high temperature applications, the compressive load of the nut against the central bridge portion of the retainer cradle causes such bridge portion to yield with a downward bowing along its longitudinal axis, accompanied by an extrusive deformation such that the flat end bearing face of the nut is no longer adequately supported by the normally flat seat provided by the bridge portion. When this occurs, the base of the nut (failing as a beam) becomes distorted to a bowed condition in which the threaded bore of the nut is expanded, reducing the support between the threads of the nut and the threads of the bolt to the point where the threads can be stripped and the grip of the nut upon the bolt released. The present invention is directed principally to this problem, and embraces the following objects:

(1) To provide a barrel nut and retainer assembly in which bending loads are not applied to the nut.

(2) To provide an improved barrel nut assembly of nut and retainer wherein the result of excessive loads will be to tighten the threaded engagement between the nut and bolt rather than to loosen it.

(3) To provide a barrel nut assembly of improved simplicity and lowered production cost in addition to the improved characteristics referred to above.

(4) To provide a barrel nut which carries its load in bearing, shear and tension as opposed to the development of bending loads.

(5) To provide a barrel nut which will allow for both angular and laterally displaced misalignment of an entering bolt, and will effect self-alignment with the bolt as it enters the nut.

(6) To provide a barrel nut which has a two-stage "fail-safe" provision for maintaining structural continuity up to the point of failure of the attaching bolt or rod.

(7) To provide a barrel nut that will develop suitable load level within standard or specified envelope dimensions when fabricated of a high-temperature alloy.

Other objects and advantages will become apparent in the ensuing specification and appended drawing in which:

FIG. 1 is a side elevational view, partially in section, of one embodiment of my improved barrel nut assembly installed, prior to the insertion of a bolt, in a cylindrical bearing bore of a body to which a fastening is to be established;

FIG. 2 is a transverse sectional view of the same, the nut being shown in end elevation;

FIG. 3 is a plan view of the barrel nut assembly;

FIG. 4 is an end view of the barrel nut assembly;

FIG. 5 is a cross-sectional view of the retainer in its initial form in which the nut (shown in end elevation) can be freely inserted during assembly;

FIG. 6 is a side elevational view of another embodiment of the invention; and

FIG. 7 is a plan view of the barrel nut of FIG. 6.

Referring now to the drawing in detail, and in particular to FIGS. 6 and 7, I have shown therein, as an example of one form in which my invention may be embodied, a barrel nut assembly comprising a nut A mounted for limited pivotal adjustment in a retainer B which in turn is mounted for rocking adjustment in a cylindrical bore of a mounting body C to which a fastening connection is to be made through a bolt shown in phantom in FIG. 2 at D.

The nut A comprises a circular ring body 10 having an internal bolt-receiving thread 11 and an external bearing surface 12 in the form of a zone of a sphere. Correspondingly, the nut has narrowed end margins 13 and 14 disposed in parallel planes normal to the major axis of the thread 11. Adjacent the end 14, the surface 12 is interrupted by an annular external groove 15 to receive the base end of a retainer spring, the side of the groove toward the center of the nut being wider than the other side and providing a spring seat shoulder 16. In one side of the external bearing surface 12, there is provided a chordal groove 17 extending parallel to the major axis of the nut, for reception of a retainer pin hereinafter referred to.

The nut A can be fabricated of any suitably tough, hard material such as steel, stainless steel or other specified material.

Retainer B is generally of segmental cylindrical form, having a segmental bearing surface 21 of somewhat more than 180 degrees extent (FIG. 4) having squared end faces 22 and a chordal crown face 23; having a zonal spherical internal bearing face 24 defining a socket in which the nut A is received with a mating fit between its zonal spherical external bearing face 12 and the socket wall 24; and having a cylindrical bolt-receiving bore 25 intersecting and coaxial with the socket 24. The crown face 23 is likewise coaxial with the common axis of bore 25 and socket 24, which may be conveniently referred to as the bolt axis. This axis intersects at right angles the major or longitudinal axis of the retainer B, about which its segmental-cylindrical bearing surface 21 is developed.

The mouth of socket 24 is defined by a relatively thin lip 27 which overhangs the outer portion of nut A to retain it captive in the socket 24. The grooved end portion of nut A projects through the socket mouth.

A retainer pin 35 is mounted in a bore in one end of the retainer B, parallel to the major axis of the retainer, and has an inner end portion projecting into the retainer slot 17 of nut A so as to provide a torque-holding connection between the nut and the retainer, preventing rotation of the nut in the socket 24 around the bolt axis while leaving the nut free to pivot about its center on a transverse axis at right angles to the axis of the pin 35. Also, the nut is left free to pivot about the axis of the pin 35 and to pivot with a combination of these two pivotal movements such that it is in effect universally pivotal in the socket 24, limited only by its inability to rotate about its own thread axis.

Pivotal adjustment above the axis of retainer pin 35 is indicated by the arrow 36 in FIG. 2. Pivotal adjustment about the transverse axis is indicated by the arrow 37 of FIG. 1.

FIGS. 1 and 3 illustrate a modified form of the invention for particular applications wherein a relatively long bearing bore is provided in the mounting body C. It differs from the other form in the retainer B' which has an elongated base 28' and segmental-conical end faces 22' converging toward the crown face 23.

The retainer B' is provided with truncated ends 26 normal to said major axis, to avoid an unnecessary and undesirable pointed condition of its ends which would result from continuing the conical end faces 22' to intersection with the central area of bearing face 21.

The mounting body C has a bearing bore 40 in which the retainer B or B' is mounted for rocking adjustment, with its segmental cylindrical bearing face 21 mating with the wall of the bore 40. The mounting body C is also provided with a through bolt bore having aligned sections 41 and 42 interrupted by the bearing bore 40. The bore section 41 receives the bolt D (FIG. 2) and the bore section 42 may be utilized for piloting the retainer spring hereinbefore referred to. Such retainer springs are well known and commonly utilized in the barrel nut art, and since the invention contemplates utilizing a conventional retainer spring, the same is not disclosed herein.

FIG. 5 illustrates how the nut is initially assembled in the retainer B. The socket 24 is provided with a mouth 45 which is cylindrical from the plane of lip 27 to a parallel plane passing through the spherical center of socket 24. Thus, the nut can be freely inserted into the socket in the initial stage of assembly. Using a suitable swaging tool, the lip 27 is then contracted inwardly to close the socket above the nut, thus capturing the nut in the socket.

The major volume of the retainer is concentrated in a thick base section 28. The radial distance between the chordal end 13 of nut A and the cylindrical bearing surface of the base portion 28 is such as to embody in the respective end portions of the base 28 (at opposite sides of the bolt bore 25) a considerable radial depth which provides maximum strength to resist the compressive loading of the nut against the base 28 under the pull of the bolt D in which high tension loading has been developed.

A major factor in the problem of failure under high loading which exists in earlier barrel nut assemblies arises from the weakening effect of the bolt bore extending through the center of the retainer and intersecting its segmental-cylindrical bearing surface along a line that is arched upwardly into the central body of the retainer so that the tensile strength of the retainer longitudinally is weakened to a maximum extent at its center. In the improved bearing retainer of the present invention, augmented longitudinal tensile strength is provided by lateral wall portions 29 (FIG. 2) which are continued from the base 28 up to the crown face 23 of the retainer.

The longitudinally extrusive forces applied to the retainer by the compressive loading of nut A, tending to separate the heavier end portions of retainer B, are more effectively contained by this augmented tensile strength. Furthermore, the side walls 29, though relatively thin in the plane of cross-section of the retainer midway between its ends as seen in FIG. 2, are of increasing thickness on both sides of this central plane, as best illustrated in the fragmentary sectioned portion of FIG. 3, resulting in uniform distribution of compressive loading against the socket wall 24 throughout its full circumference (as viewed in plane in FIG. 3), and the majority of the compressive loading is above the substantially solid end portions of base 28 on respective sides of bolt bore 25 as viewed in FIG. 1. In any tendency of the retainer to buckle or yield under the compressive loading of the nut A against socket 24, the bending stress against the weaker central portions of side walls 29 is minimized by the full-area compressive containment of side wall portions 29 between nut A and the wall of bore 40. Thus far greater loads can be taken by this improved nut assembly than in the case of the earlier types of barrel nuts.

Finally, the forces which tend to spread the nut and to unload the bolt threads when the loads approach the beam strength limit of the nut in the conventional barrel nut, are eliminated and in fact reversed in this improved barrel nut assembly, by virtue of the wedging effect of the converging load-bearing portion of the socket wall 24 (the lower portion as seen in FIG. 1). This wedging effect results in a constricting action against the leading end of the nut A which exerts the compressive loading against the socket wall 24. This constricting action closes the nut threads even more tightly against the bolt threads so as to actually increase the load-sustaining engagement between the threads in response to increased loading, and it becomes impossible for the nut to spread and unload the threads, even though the retainer B should yield by bearing failure, compression, or by extrusion away from the bolt hole 25. In fact, in tests that have been made upon one of my improved barrel nut assemblies, wherein the tension loads on the bolt and the corresponding compressive loading of the nut against the retainer were increased far above specified operational ranges, to the point where the retainer was fractured across its center and the two end portions thereof separated so as to completely release the nut, the nut was actually drawn into the bolt bore of the body C and its leading end extruded into such bore, with a complete absence of any thread release or failure between the bolt and nut. On the contrary, at the end of this experiment the nut was tightly locked to the bolt to an extent such that it was difficult to turn the bolt in the nut.

Thus the invention has provided a two-stage fail-safe anchorage of the bolt to a mounting body such as body C. In the first stage, the nut A is supported by retainer B. All leading requirements for which the bearing nut assembly is designed, are handled within this stage, and well within the failure limit of retainer B. In the second stage (which will occur only if the loading exceeds the failure limit of retainer B) the failure of the retainer results only in the dropping of the nut A down onto the bearing seat provided by mounting body C around bolt hole 41, which seat is exposed by the separation of the end portions of retainer B, and the nut is then directly supported by the body C, with its leading end wedged into the mouth of bolt hole 41 and its constricting grip upon the bolt threads thereby continued.

I claim:

1. In a heavy load bearing barrel nut and retainer assembly in which compression loads without bending load components are applied to the nut, for insertion in a bearing bore in a mounting body, in combination: a retainer having a segmental-cylindrical bearing surface of at least 180° circumferential extent and a substantially plane chordal crown face, said bearing surface being coaxial with a major longitudinal axis, said bearing surface adapted for engagement with the wall of said bore and having a bolt bore extending therethrough and intersecting said major axis at right angles and being substantially perpendicular to said crown face, said retainer including an integral retainer wall defining a zonal-spherical bearing socket in the form of a truncated sphere of substantially hemispherical extent opening in said crown face and communicating at its bottom with said bolt bore, said retainer wall terminating in an annular marginal lip remote from the center of said bearing surface and extending from said crown face, said retainer wall having integral circumferential continuity around said socket throughout its height from said center to said lip; a nut in the form of a truncated sphere having a zonal-spherical peripheral surface and substantially parallel end surfaces, said peripheral surface received in and fully mating with the wall of said socket, and an axial bore through said nut and extending substantially perpendicular to said end surfaces and threaded throughout its length for coupling to a bolt extended through said bolt bore; and a torque-holding connection between said nut and said retainer, within the spherical surface of the nut, such as to hold said nut against rotation about the axis of said threaded bore while permitting said nut to freely pivot in said socket for self-aligning adjustment to said bolt when inserted in the nut; said torque-holding means comprising a pin anchored in said retainer and projecting from the spherical bearing surface of said socket toward the center of said socket, and a groove in the side of said nut, in which the projecting inner end of said pin is engaged to provide a non-rotatable connection between the nut and retainer, said groove extending chordally substantially across said spherical peripheral surface parallel to said thread axis.

2. A barrel nut assembly as defined in claim 1, said lip being coaxial with said bolt bore, defining a mouth of said socket which is of less diameter than said peripheral surface, and being in retaining engagement with said peripheral nut surface, such as to retain the nut captive in said socket.

3. A nut assembly as defined in claim 2, wherein said nut has an end portion projecting out of said mouth and provided with an annular spring-seat groove coaxial with said thread axis.

4. A barrel nut assembly as defined in claim 1, wherein said retainer, in side elevation, is of buttress form and solid except for said bearing socket and bolt bore, having an elongated base portion and segmental-conical end faces coaxial with and converging to said crown face from said base portion, said elongated base portion having the intermediate portion of said segmental-cylindrical bearing surface as its load-bearing face.

References Cited by the Examiner
UNITED STATES PATENTS

| | | | |
|---|---|---|---|
| 2,061,768 | 11/36 | Hossfeld | 84—50 |
| 2,168,714 | 8/39 | Neptune | 151—41.7 |
| 2,371,927 | 3/45 | Schmidt et al. | 151—41.76 |
| 2,789,457 | 4/57 | Allen | 85—32 |
| 2,820,499 | 1/58 | Schaaf | 151—41.7 |
| 2,920,672 | 1/60 | Bronson | 151—41.76 |

EDWARD C. ALLEN, *Primary Examiner.*